United States Patent [19]

Aoki et al.

[11] Patent Number: 4,840,073
[45] Date of Patent: Jun. 20, 1989

[54] TORQUE DETECTING DEVICE

[75] Inventors: Hiroyuki Aoki, Yokohama; Shinichiro Yahagi, Ohbu; Takanobu Saito, Tohkai, all of Japan

[73] Assignees: Nissan Motor Company Ltd.; Daido Tokushuko Kabushiki Kaisha, both of Japan

[21] Appl. No.: 101,213

[22] Filed: Sep. 25, 1987

[30] Foreign Application Priority Data

Sep. 26, 1986 [JP] Japan ................. 61-226062
Dec. 27, 1986 [JP] Japan ................. 61-310685

[51] Int. Cl.⁴ .............................. G01L 3/10
[52] U.S. Cl. ...................... 73/862.36; 324/209
[58] Field of Search ............. 73/862.36, 862.69, 779, 73/DIG. 2; 324/209

[56] References Cited

U.S. PATENT DOCUMENTS 4,627,298 12/1986 Sahashi et al. ............. 73/862.36
4,631,796 12/1986 Inomata et al. ............. 73/862.36

FOREIGN PATENT DOCUMENTS 181575 10/1984 Japan ...................... 73/862.36

OTHER PUBLICATIONS

Mohri, "Review on Recent Advances in the Field of Amorphous Metal Sensor...", IEEE Trans on Magnetics, vol. MAG 20, No. 5, Sep. 1984.

Primary Examiner—Charles A. Ruehl
Attorney, Agent, or Firm—Sughrue, Mion, Zinn, Macpeak and Seas

[57] ABSTRACT

A torque detecting device has a measuring shaft and a magnetic circuit incorporating the measuring shaft into a magnetic path which includes a device for detecting a magnet-ostrictive force passing through said measuring shaft. The device is able to increase the output sensitivity, decrease the rotative fluctuation of output and decrease the hysteresis by making the measuring shaft forming the magnetic path from an iron base alloy having a specific composition.

16 Claims, 7 Drawing Sheets

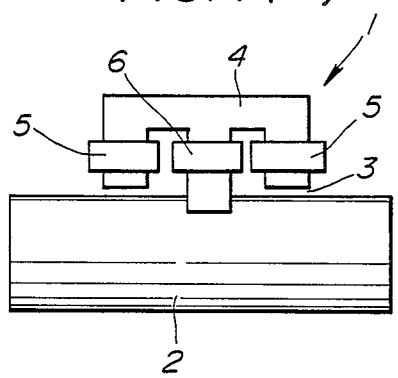
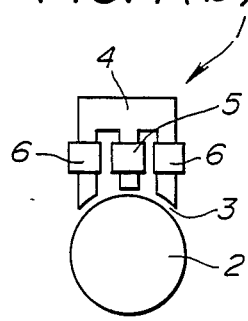
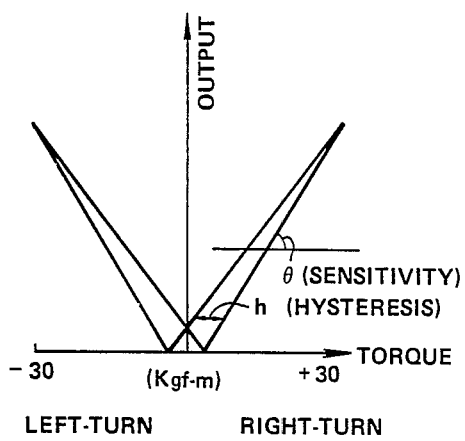
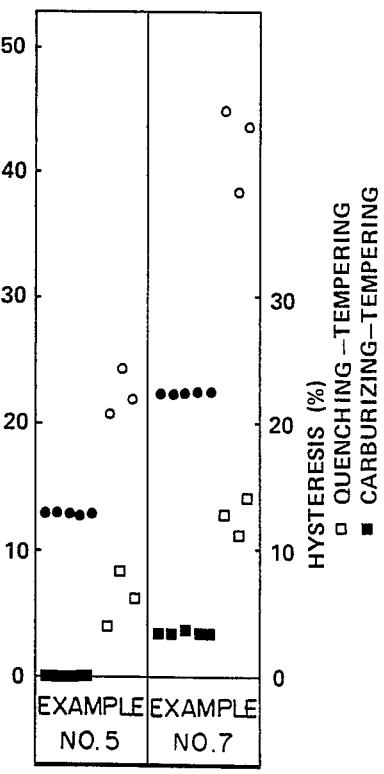

TORQUE DETECTING DEVICE

BACKGROUND OF THE INVENTION

1. Field of the Invention

This invention relates to a torque detecting device of the magnetostriction type used for detecting torque and, more particularly, to an improved torque detecting device which will increase the output of power, decrease the rotative fluctuation of output, and decrease the hysteresis.

2. Description of the Prior Art

It is known that the strain of shaft material is larger at the surface of the shaft rather than at the center when a torque is applied on a measuring shaft such as a rotatable shaft, a fixed shaft and the like.

For example, if torque T is applied clockwise on the measuring shaft against a cross section thereof, a tensile stress $+\delta$ in the direction slanted on the right side at an angle of 45° to the shaft axis and a compressive stress $-\delta$ in the direction slanted on the left side at an angle of 45° are generated around the shaft as shown in FIG. 11.

A magnetic substance having a characteristic such that permeability is varied in response to the applied stress on it is called a magnetostriction characteristic, so that the applied stress on a magnetic substance may be measured magnetically using the characteristics of magnetic substances.

There are properties where the permeability increases in the direction of tensile stress in the magnetic substance having the positive magnetostriction and conversely the permeability decreases in the direction of tensile stress in the magnetic substance having the negative magnetostriction.

In the case of detecting the torque applied on a shaft such as a rotatable shaft, a fixed shaft and the like using these properties, it is possible to obtain a large detecting output by concentrating the magnetic flux generated from the excitation coil to the surface of the shaft, i.e., the part in which large strain is produced.

FIGS. 12(a), 12(b) show a conventional torque detecting device. This torque detecting device 51 has a structure wherein a yoke 54 made from a material with high permeability such as a permalloy is disposed in the vicinity of a measuring shaft 52 consisting of magnetic substance having a magnetostriction effect and spaced a distance 53 from said measuring shaft 52. The yoke 54 is provided with two excitation coils 55 as exciting means forming a magnetic circuit incorporating said measuring shaft 52 into a part of a magnetic path and two detection coils 56 as detecting means detecting the magnetostrictive force passing through said measuring shaft 52, and the magnetic flux generated from the excitation coils 55 forms a magnetic circuit in which the measuring shaft 52 and the yoke 54 are part of the magnetic path.

In the torque detecting device 51, as shown in FIG. 11 for example, when the torque T is applied clockwise on the measuring shaft 52 against the cross section thereof, the sum of the increasing permeability caused by tensile stress $+\phi$ in the direction slanted on the right side at the angle of 45° to the shaft axis and decreasing of the permeability caused by compressive stress $-\phi$ in the direction slanted on the left side at the angle of 45° is used as an output.

More detailed explanations are given as follows. On the occasion of operating the torque detecting device 51 of a magnetostriction type having the aforementioned structure, the magnetic circuit passing through the measuring shaft 52, the gap 53, the yoke 54, the gap 53 and the measuring shaft 52 is formed by charging the excitation coils 55 with electricity. At this time, an induced electromotive force is produced in the coils 56.

In such a state, if the torque T is applied on the measuring shaft 52, the magnetic flux density passing through said magnetic circuit varies as a result of variation of permeability of the measuring shaft 52 due to the magnetostriction effect of the measuring shaft 52 as described above. Correspondingly the variation of the induced electromotive force produced in the detection coils 56 varies and so it is possible to detect the torque applied on said measuring shaft 52 by reading of the said variation of induced electromotive force.

In the case of torque detecting device 51 an output characteristic as shown in FIG. 13 for example is obtained and obtaining this characteristic detection of the torque is carried out by means of a corresponding applied torque detector with detecting output. (Japanese Patent Application No. 60-79238)

However, when the torque applied on a power transmission shaft used as a drive shaft, column shaft and the like is intended to be detected, if the power transmission shaft is used itself as a measuring shaft 52 using a torque detecting device of the magnetostriction type having the structure shown in FIGS. 12a and 12b, the power transmission shaft is generally made from ordinary structural steel, such as JIS, SC, SCr, SCM SNCM and the like, so that the magnetrostriction effect is small and the angle $\theta$ in the output of the characteristic diagram shown in FIG. 16 is also small. Accordingly, it is impossible to obtain sufficient sensitivity for detection. Further, the problem existed in that it is difficult to detect the torque with accuracy because the width h in said output of the characteristic diagram shown in FIG. 16 becomes large and the hysteresis becomes easy to produce.

Besides, the shaft, such as a rotatable shaft or a fixed shaft provided for measuring the torque, on which a local stress in consequence of machining or heat treatment such as hardening is generally applied, reaches a state where the magnetic wall shifts and sticks due to local stress. Therefore, the permeability is distributed in a state having local anisotropy as shown in FIG. 14 and if the torque is measured in such a state, the output is such that torque T=O kgf-m as shown in FIG. 15 (hereinafter, referred to as "zero-torque") appears as a fluctuation according to the rotative position of the measuring shaft 52. Since the state of distributed permeability in local anisotropy does not vanish but is kept in the range of torque to be measured, the relation between the torque T and output shown in FIG. 15 appears as a fluctuation of output according to the rotative position of the measuring shaft 52 even if the torque T increases, the problem exists that it is impossible to measure the torque T acting on the measuring shaft 52 with accuracy.

Heretofore, the measuring shaft 52 is usually heated to high temperature and subjected to annealing for stress relieving in order to dissolve the state of distributed permeability in local anisotropy as mentioned above in the measuring shaft 52.

However, if the annealing at high temperature is performed on the measuring shaft 52, the material is softened and it becomes easy to cause plastic deformation, and the problem exists that the detecting accuracy of the torque is lowered in consequence of the appearance of hysteresis which is large as shown in FIG. 16.

Thus, on the conventional torque detecting device 51, if the fluctuation of output due to the rotation of the measuring shaft 52 is desired to be eliminated, the hysteresis increases and conversely if the hysteresis is desired to be kept small, the fluctuation of output due to the rotation increases.

SUMMARY OF THE INVENTION

This invention is made in view of the above-mentioned problems of the prior art, in particular on the occasion of the detecting of torque applied on the rotating shaft by using a loaded rotative shaft such as a power transmission shaft as a measuring shaft, it is an object of the invention to provide a torque detecting device which has a high detection sensitivity, small hysteresis and which may be used for detection of torque with accuracy, on the condition that the strength of the rotative shaft, such as power transmission shaft used as a measuring shaft of the torque detecting device, is maintained sufficiently.

Further, another object is to provide a torque detecting device with high accuracy in which the detecting output of torque never fluctuates due to rotative position of the measuring shaft even if the measuring shaft is used in a rotating state and moreover, the hysteresis is able to decrease remarkably by means of detection of the total variation of permeability over the whole circumference of the measuring shaft without picking up the local anisotropy of permeability in the measuring shaft.

A torque detecting device according to one of the preferred aspects of this invention has a measuring shaft and a coil for forming a magnetic circuit incorporating said measuring shaft into a part of the magnetic path. The torque detecting device detects torque by means of detection of a component of magnetostriction passing through the measuring shaft, wherein said measuring shaft is made from steel comprising, by weight percentage of, 0.1-1.5% of C, not more than 2.0 of Si, not more than 2.0% of Mn, and one or both of not more than 5.0% of Ni and not more than 5.0% of Cr, and if necessary, at least one of not more than 0.05% of B, not more than 0.5% of W, not more than 0.5% of V, not more than 0.5% of Ti, not more than 0.5% of Nb, not more than 0.5% of Ta, not more than 0.5% of Zr, not more than 0.5% of Hf, not more than 0.1% of Al and not more than 0.1% of N, with the remainder being iron and impurities.

A torque detecting device of the another preferred aspect of this invention has a measuring shaft and a coil for forming a magnetic circuit incorporating said measuring shaft into a part of the magnetic path, and in the torque detecting device for detecting the torque by means of detection of a component of magnetostriction passing through the said measuring shaft, said measuring shaft is made from a Fe-Al alloy which is composed of the disordered phase, or mixed phase comprising at least two phases of $Fe_3Al$ type ordered phase, FeAl type ordered phase and disordered phase, and the order parameter of $Fe_3Al$ type ordered phase is not more than 0.9.

BRIEF DESCRIPTION OF THE DRAWINGS

FIG. 1(a) is a side elevational view, and FIG. 1(b) is an end elevational view illustrating the structure of the torque detecting device of Example 1 of this invention.

FIG. 2 is a graph showing the output characteristics of the torque detecting device;

FIG. 3 is a graph showing the experimental results measuring output sensitivity and hysteresis of the Examples No. 5 and No. 7 of this invention in the case of carburizing and not carburizing on them;

DETAILED DESCRIPTION OF THE INVENTION

Figure 4:
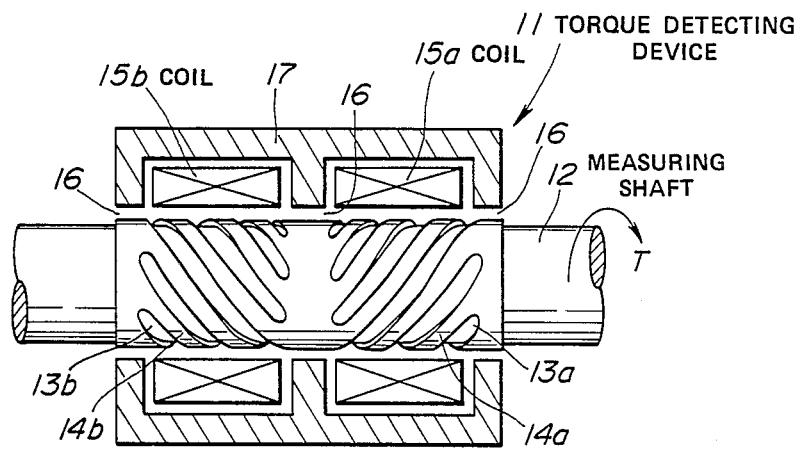
FIG. 4 is a partial cross-sectional view illustrating the structure of the torque detecting device of Example 2 of this invention.

As described above, a torque detecting device according to one of the preferred aspects of this invention has a measuring shaft and coil for forming a magnetic circuit incorporating said measuring shaft into a part of magnetic path, and a torque detecting device for detecting the torque by means of detection of a component of magnetostriction passing through the said measuring shaft, wherein said measuring shaft is made from steel comprising, by weight percentage of 0.1-1.5% of C, not more than 2.0% of Si, not more than 2.0% of Mn, and one or both of not more than 5.0% of Ni and not more than 5.0% of Cr, and if necessary, at least one of not more than 1.0% of Cu, not more than 1.0% of Mo, not more than 0.05% of B, not more than 0.5% of W, not more than 0.5% of V, not more than 0.5% of Ti, not more than 0.5% of Nb, not more than 0.5% of Ta, not more than 0.5% of Zr, not more than 0.5% of Hf, not more than 0.1% of Al and not more than 0.1% of N, with the remainder being iron and impurities.

As a concrete structure of the torque detecting device according to one preferred aspect, the device may be structured as a yoke 4 made from a material with high permeability which is disposed around a measuring shaft 2 leaving a gap 3 between the device and said measuring shaft 2. The yoke 4 is constructed with an excitation coil (i.e., means of excitation) 5 and a detection coil (i.e., means of detection) 6 thereon, as shown in FIG. 1.

Also, it may be structured such that two coils are disposed around a measuring shaft, for forming the magnetic circuit incorporating said measuring shaft into a part of the magnetic path by connecting the AC power source (i.e., means of excitation) to said two coils, so that variation of permeability of said measuring shaft due to the application of torque is detected as a variation of inductance of said coils by an AC bridge (i.e., means of detection), but it is not restricted to such structures.

Further, in the preferred aspect of this invention, the measuring shaft 2 of the torque detecting device 1 of the magnetostriction type is characterized by using the above-mentioned steel comprised of a specified composition in a part or whole body thereof. The reason why the chemical composition (weight %) thereof is limited is explained as follows:

C: 0.1-1.5%

C is a necessary element to maintain the strength required in structural materials for a shaft used as a power transmission shaft, a drive shaft, column shaft, etc. For this purpose, not less than 0.1% of C is included. However, if the amount is too large, the toughness is degraded and plastic workability in cold is adversely affected so that the amount of C is not more than 0.5%, and in case of including of W, V, Ti, Nb, Ta, Zr, Hf is not more than 1.%=5%.

Si: not more than 2.0%

Si acts as a deoxidizer in steel making and is an effective element for increasing the strength. However, if the amount is too large, the toughness is degraded so that it is not more than 2.0%.

Mn: not more than 2.0%

Mn acts as a deoxidizer and a desulfurizing agent in steel making and is an effective element for increasing the strength in consequence of improvement of hardenability of steel. However, if the amount is too large, the workability is degraded so that the amount of:

Mn is not more than 2.0%;
Ni: not more than 5.0%; and
Cr: not more than 5.0%.
Ni and Cr are effective elements for increasing the strength in consequence of improvement of the hardenability of steel and reinforcement of the matrix.

In this case, although the sensitivity is improved (i.e., the angle $\theta$ in FIG. 2 is enlarged) by increasing the amount of Ni, the hysteresis is increased (i.e., the width h in FIG. 2 is enlarged), so that it is necessary to be not more than 5.0% of Ni. And, although the hysteresis shows a tendency to decrease (i.e., the width h in FIG. 2 becomes smaller) by increasing the amount of Cr to a certain degree, the sensitivity is degraded (i.e., the angle $\theta$ in FIG. 2 becomes smaller), and if the amount of Cr is too large, the hysteresis has a tendency to increase over again, so that it is necessary to be not more than 5.0% of Cr.

Like this, nevertheless, Ni and Cr have the common effect of improving the strength of a measuring shaft and have a different effect on the magnetic property of the measuring shaft. It is desirable that the amount of Ni+Cr is limited to a range of 1.5-4.0% in order to improve the sensitivity of the torque detecting device of magnetostriction type and decrease they hysteresis in addition. Especially, it is preferable that the amount of Ni+Cr is limited to a range of 2.0-3.0% in order to decrease the hysteresis.

Cu: not more than 1.0%

Mo: not more than 1.0%.

Both Cu and Mo may be added according to demand because these are effective elements for improving the strength by reinforcing the matrix. However, if the amount of Cu is too large, the hot workability is degraded and if the amount of Mo is too large, the toughness is degraded, so that if they are added, it is suitable that the amount of Cu is not more than 1% and the amount of Mo is not more than 1.%.

Besides, not more than 0.05% of B may be added in order to improve the hardenability of steel, and at least one of not more than 0.5% of W, not more than 0.5% of V, not more than 0.5% of Ti, not more than 0.5% of Nb, not more than 0.5% of Ta, not more than 0.5% of Zr, not more than 0.5% of Hf, not more than 0.1% of Al and not more than 0.1% of N may be added in order to improve the strength by grain refining and precipitation hardening.

For the measuring shaft used for the torque detecting device according too the preferred aspect of this invention, steel having above-described composition is used as a material. If necessary, it is desirable to perform not only the ordinary quenching-tempering but also the carburizing, carburizing-tempering, carbonitriding, nitriding and the like for example, and it is desirable to keep the amount of C in the carburized layer in a range of 0.1% to 1.5% according to demand, in order to decrease the hysteresis and the amount of scatter in the output sensitivity and hysteresis of the individual measuring shaft, and in order to increase the abrasion resistance and fatigue strength of the surface according to demand.

Further, at least one of not more than 1.0% of Pb, not more than 0.5% of Ca, not more than 0.5% of Se, not more than 0.5% of Te, not more than 0.5% of Bi and not more than 0.5% of S may be added in order to improve machinability of the measuring shaft.

A torque detecting device according to another preferred aspect of this invention as described above, has a measuring shaft and a coil for forming magnetic circuit incorporating said measuring shaft into a part of the magnetic path, and a torque detecting device for detecting the component of magnetostriction passing through the said measuring shaft, wherein said measuring shaft is made from Fe-Al alloy which is composed of the disordered phase, or mixed phase comprising at least two phases of Fe$_3$Al type ordered phase, FeAl type ordered phase and disordered phase, and the order parameter of Fe$_3$Al type ordered phase is not more than 0.9.

In another preferred aspect of this invention, said measuring shaft may be given shaped-magnetic anisotropy by forming a concavity and/or a convexity leaving a suitable space on the surface thereof and making a certain angle with the shaft axis of said measuring shaft. Concretely, for example shaped-magnetic anisotropy due to irregular section may be formed by a pair of irregular sections inverting the direction thereof, and furthermore the structure may be wrapped with a pair of coils facing said pair of irregular sections. In the case of wrapping with a pair of coils, the said coils may be connected with an excitive oscillator which is adjusted to the same direction. Furthermore, the device may detect a variation of permeability according to the applied torque at a said pair of irregular section as an inductance variation of facing coils through a differential amplifier by an AC bridge.

In the torque detecting device according to another preferred aspect, a shaft made from iron-aluminum alloy composed of disordered phase in a part or the whole of the shaft, or a shaft made from iron-aluminum alloy composed of mixed phase comprising at least two phases of $Fe_3Al$ type ordered phase of which order parameter is not more than 0.9, FeAl type ordered phase and disordered phase in a part or the whole of the material is used for the measuring shaft. In this case it is preferable to use an alloy comprising aluminum in a range from 8 to 18%, more particularly 11 to 15%.

Figure 9:
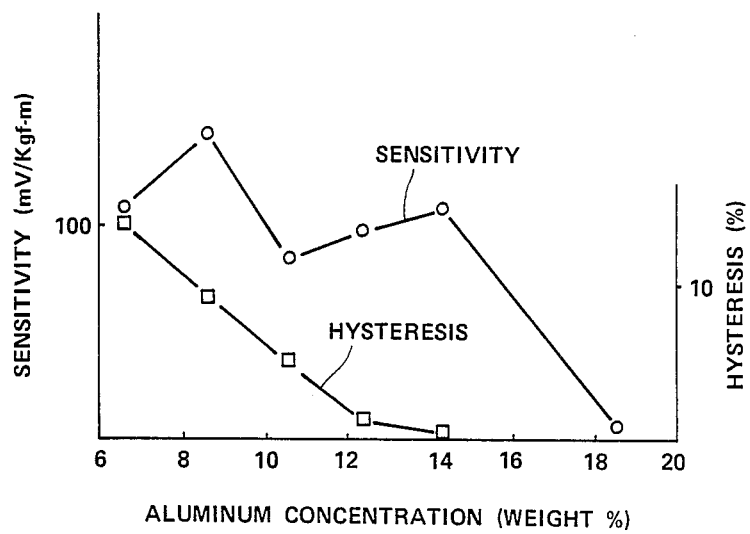
FIG. 9 is a graph exemplifying the results reached under influence of aluminum concentration in said iron-aluminum alloy on output sensitivity and hysteresis of the torque detecting device using a measuring shaft made from iron-aluminum alloy composed of the disordered phase or mixed phase comprising at least two phases of $Fe_3Al$ type ordered phase, FeAl type ordered phase and disordered phase.

The relationship between aluminum concentration in the iron-aluminum alloy, output sensitivity and hysteresis in the various experimental study, is shown in FIG. 9. FIG. 9 shows experimental results when the measuring shaft shaped as shown in FIG. 4, described later, is made by hot working →cooling down. As shown in FIG. 9, the sensitivity becomes zero if aluminum concentration exceeds 18 weight %, the hysteresis decreases as the aluminum concentration increases and becomes zero in the neighborhood of 14 weight %.

Accordingly, although there is some difference according to the accuracy required for the torque detecting device, on an ordinary occasion, it is desirable to satisfy the accuracy within 10% of hysteresis, and it is suitable that aluminum concentration is not less than 8 weight %. If the aluminum concentration exceeds 18 weight %, the magnetism vanishes and the sensitivity becomes zero at room temperature, so that it is suitable to be not more than 18 weight %, more particularly to be 11 to 15%.

Figure 10:
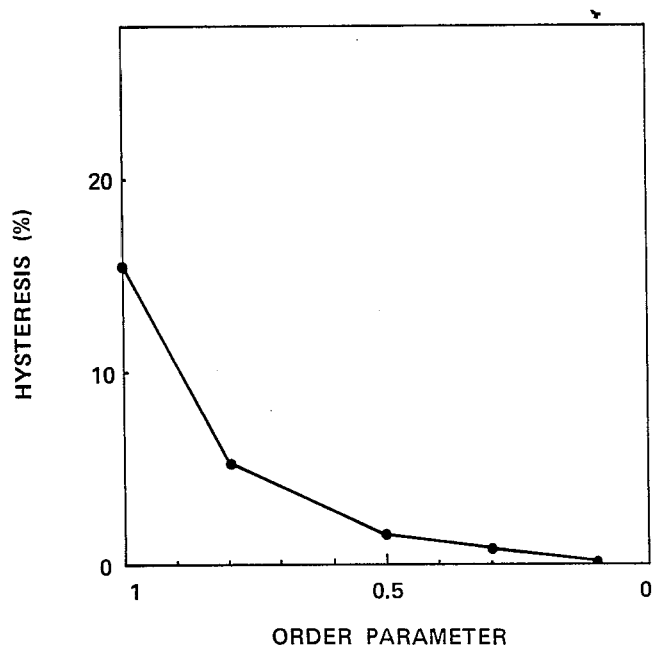
FIG. 10 is a graph exemplifying the results reached under influence of order parameter of said $Fe_3Al$ type ordered phase on the hysteresis.
Figure 11:
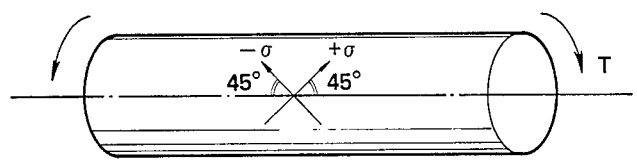
FIG. 11 is a perspective diagram showing the relation of torque T applied on shaft and stress δ.
Figure 12A:
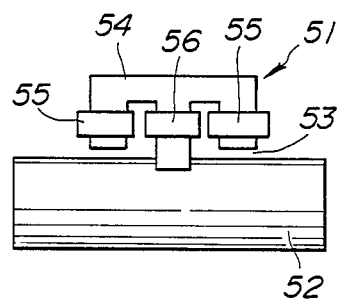
FIG. 12(a) and FIG. 12(b) are schematic front view and schematic side views illustrating the structure of a conventional torque detecting device.
Figure 12B:
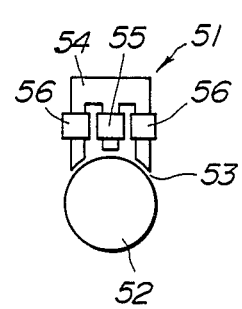
Figure 13:
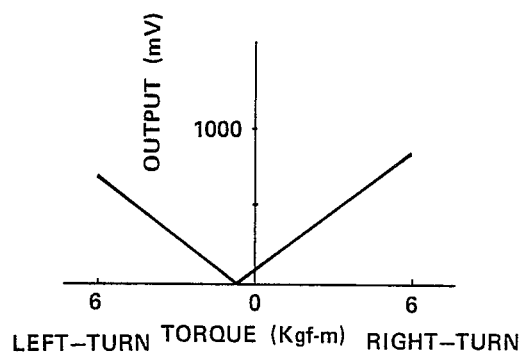
FIG. 13 is a characteristic diagram illustrating the relationship of torque and output when the measuring shaft is fixed at a certain position on the torque detecting device.
Figure 14:
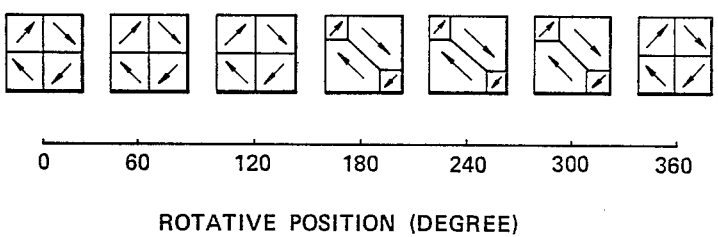
FIG. 14 is a conceptual diagram illustrating the state of contribured permeability in local anisotropy at the surface of an ordinary shaft.
Figure 15:
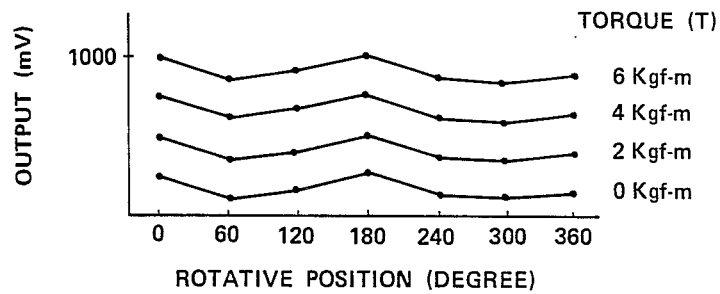
FIG. 15 is a characteristic diagram illustrating the fluctuation of detecting output when the measuring shaft is rotated through one turn with a conventional torque detecting device.
Figure 16:
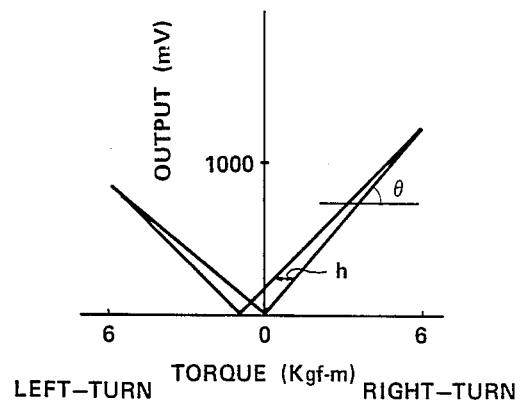
FIG. 16 is a characteristic diagram illustrating the relationship of torque and output using a measuring shaft which is heated to high temperature and subjected to a stress relief annealing in order to decrease the rotative fluctuation of output on the conventional torque detecting device.

Further, the result shown in FIG. 10 is obtained as a consequence of the investigation for the relation of order parameter of $Fe_3Al$ type ordered phase and hysteresis. As shown in FIG. 10, if the order parameter of $Fe_3Al$ type ordered phase exceeds 0.9 and approaches and perfect ordered phase, the hysteresis increases and exceeds 10%, so that the order parameter of $Fe_3Al$ type ordered phase is limited to not more than 0.9.

The order parameter of $Fe_3Al$ type ordered phase is able to be controlled by selecting a cooling method for the materials after the end of casting, hot forging, hot rolling, hot extrusion and the like, a quenching method after the heating to the disordered region, or a temperature or holding time during reheating to under the $Fe_3Al$ type ordered/disordered phase transformation point after said quenching.

Thus, using the iron-aluminum alloy composed of disordered phase or iron-aluminum alloy composed of mixed phase comprising at least two phase of $Fe_3Al$ type ordered phase of which order parameter is not more than 0.9, FeAl type ordered phase and disordered phase as a material for the measuring shaft, a torque detecting device having excellent output characteristics for both antinomical properties wherein the sensitivity is high and the hysteresis is remarkably small may be obtained.

It has been certified that it is more desirable that the electrical resistivity of the iron-aluminum alloy used for at least a part of the measuring shaft is not less than 75 $\mu\Omega$-cm according to another experiment. It is noted that the higher the cooling rate after the manufacturing of a measuring shaft by means of casting or hot forging, the larger the electric resistivity of manufactured measuring shaft, and the greater the amount of disordered phase, the lower the hysteresis.

In total amount of at least one of B, Si, Ge, Sn, Pb, P, Sb, Cu, Ni, Co, Mn, Cr, Mo, W, V, Nb, Ta, Ti, Zr, Hf, Be, Sc, Y and Rare Earth Element: 0.01–5.0%.

These elements act as deoxidizers and/or desulfurizers in melting, to strengthen the material by the improvement of the quenching property or precipitation, to accelerate the fine of the grain size, and to control the diffusion of C, W, Cr, to improve forgability.

Larger amount of these element deteriorate workability, toughness, hysteresis and the like, therefore the upper limit of the total of these elements is determined to 5.0%.

C: 0.01–0.50% and in total of at least one of Cr, Mo, W, V, Nb, Ta, Ti, Zr and Hf: 0:0–5.0%.

C and Cr, Mo, W, V, Nb, Ta, Ti, Zr, Hf are the elements forming carbides in the matrix in order to improve the strength of the measuring shaft, for example, a driving shaft, a column shaft etc. However, large amounts of these elements deteriorate the workability of the shaft, so that C is limited to 0.01–0.50%, at least one of Cr, Mo, W, V, Nb, Ta, Ti, Zr and Hf is limited to 0.01–5.0% in total.

In the measuring shaft of the torque detecting device, the shaft may be subjected to a heat-treatment which is cooled at the cooling rate of more than 500° C./hr from a temperature of more than 500° C. in order to improve the sensitivity of output and hysteresis.

As explained above, the torque detecting device according to this invention has a measuring shaft and a coil for forming a magnetic circuit incorporating said measuring shaft into a part of the magnetic path and, a torque detecting device for detecting the component of magnetostriction passing through the said measuring shaft, wherein said measuring shaft is made from the iron base alloy having the specific composition or structure, so that it is remarkably effective for increasing the output, decreasing the rotative fluctuation of output, and decreasing the hysteresis on the torque detecting device of the magnetostriction type used for detecting the torque.

EXAMPLE 1

Each of steels having a chemical composition as shown in Table 1 was cast after melting, and rods of 17mm in diameter were made by blooming and finish rolling.

Next, each of the rods was subjected to a carburizing at a condition of 900° C. for 2 hours and quenched into oil, then tempered at 170° C. In this case, the amount of C in the carburized layer is shown together in the Table 1.

Secondly, by using each of the heat treated rods as a measuring shaft 2 of the torque detecting device 1 having a structure shown in FIGS. 1(a) and 1(b) and by means of supplying an AC having a frequency of 50

KHz and a current of 100 mA to the excitation coil 5, a magnetic circuit passing through the measuring shaft 2, gap 3, yoke 4, gap 3, measuring shaft 2 is formed. The output sensitivity (the angle in FIG. 2) and hysteresis (the width h in FIG. 2) of each torque detecting device 1 was examined by measuring the output voltage of each torque detecting device 1 with the detection coil 6 when a torque of 30 Kgf m is applied to the left and right-handed rotation respectively. These results are shown in Table 1 similarly.

apparent from FIG. 3, good results are obtained on both carburized material and non-carburized material, but it is seen that carburized material is preferable because of low hysteresis and small amount of scattering as characteristics.

As described above, in Example 1 according to this invention, the torque detecting device has a measuring shaft consisting of magnetic substance, and means of excitation for forming magnetic circuit incorporating said measuring shaft into a part of magnetic path, and

TABLE 1

| No. | Chemical composition (weight %) | | | | | | | | Amount of C in the carburized layer (weight %) | Sensitivity (mV/Kgf-m) | Hysteresis (%) |
|---|---|---|---|---|---|---|---|---|---|---|---|
| | C | Si | Mn | Ni | Cr | Cu | Mo | Others | | | |
| Example | | | | | | | | | | | |
| 1 | 0.30 | 0.45 | 0.45 | 2.00 | — | — | — | — | 0.60 | 21 | 3 |
| 2 | 0.15 | 0.40 | 0.80 | — | 2.50 | — | — | Al: 0.03 N: 0.01 | 0.79 | 12 | 1 |
| 3 | 0.25 | 0.70 | 0.80 | — | 4.00 | 0.75 | — | Ta: 0.15 | 0.82 | 15 | 2 |
| 4 | 0.20 | 0.25 | 0.75 | 0.10 | 1.00 | 0.10 | 0.16 | — | 0.74 | 12 | 9 |
| 5 | 0.20 | 0.25 | 0.75 | 0.10 | 2.00 | 0.10 | 0.16 | Ti: 0.03 Zr: 0.05 | 0.78 | 13 | 0 |
| 6 | 0.20 | 0.25 | 0.75 | 1.50 | 1.00 | 0.10 | 0.16 | — | 0.72 | 20 | 2 |
| 7 | 0.20 | 0.25 | 0.75 | 2.00 | 0.50 | 0.10 | 0.16 | Pb: 0.15 | 0.60 | 22 | 3 |
| 8 | 0.35 | 0.15 | 0.90 | 2.50 | 0.30 | — | — | Nb: 0.20 V: 0.20 B: 0.005 | 0.63 | 22 | 3 |
| 9 | 0.20 | 0.25 | 0.75 | 1.00 | 2.00 | 0.10 | 0.16 | — | 0.76 | 20 | 3 |
| 10 | 0.20 | 0.25 | 0.75 | 2.50 | 1.00 | 0.10 | 0.16 | Ca: 0.02 S: 0.02 | 0.75 | 24 | 3 |
| 11 | 0.18 | 0.35 | 0.70 | 3.00 | 2.50 | — | — | — | 0.76 | 27 | 8 |
| 12 | 0.33 | 0.60 | 0.75 | 4.50 | 4.00 | 0.60 | — | — | 0.80 | 31 | 7 |
| Comparative Example | | | | | | | | | | | |
| 13 | 0.19 | 0.35 | 1.05 | 6.00 | — | 0.70 | — | — | 0.55 | 40 | 15 |
| 14 | 0.27 | 0.30 | 0.60 | — | 6.00 | 0.30 | — | — | 0.75 | 10 | 18 |

As apparent from the results shown in Table 1, in the case of Example Nos. 1–3 and Nos. 5–10 according to the invention in which the amount of Ni is not more than 5.0% the amount of Cr is not more than 5.0% and the total amount of them is in a range of 1.5–4.0%, the value of sensitivity is in a range of 12–24 mV/Kgf·m, the percentage of hysteresis is in a range of 0–3%, and consequently both sensitivity and hysteresis show satisfactory results.

In the case of Example No. 4 according to the invention, in which the amount of Ni is not more than 5.0%, the amount of Cr is not more than 5.0% and the total amount of them is less than 1.5%, it is obvious that its sensitivity is lower and its hysteresis is larger than that case using a measuring shaft in which the total amount of Ni and Cr is not less than 1.5%. Contrary to this, in the case of Examples No. 11 and 12 according to the invention, in which the total amount of Ni and Cr is not less than 4.0%, though the sensitivity of them is good, the hysteresis of them is comparatively large.

Further, in the case of comparative Example No. 13, comprising no Cr and not less than 5.0% of Ni, although its sensitivity is good, its hysteresis is too large. In the case of comparative Example No. 14, comprising no Ni and not less than 5.0% of Cr, it is obvious that not only its hysteresis is too large, but also its sensitivity is too low.

In FIG. 3, measuring results of sensitivity θ and hysteresis h according to the same experimental procedure as described above are shown, providing the matter subjected to the carburizing as shown in FIG. 1 and another one not subjected to the carburizing as shown in FIG. 1 respectively, using the two kinds of alloys of Example Nos. 5 and 7 according to the invention. As means of detection for detecting a component of magnetostriction passing through said measuring shaft, the output sensitivity of the said torque detecting device is able to increase and the hysteresis can be decreased at the same time, and detection of torque can be performed with accuracy while maintaining the strength of measuring shaft sufficiently because that said measuring shaft is made from the steel comprising by weight percentage of 0.1–1.5% C, not more than 2.00% of Si, not more than 2.0% of Mn and one or both of not more than 5.0% of Ni and not more than 5.0% of Cr, and if necessary, at least one of not more than 1.0% of Cu, not more than 1.0% of Mo, not more than 0.05% of B, not more than 0.5% of W, not more than 0.5% of V, not more than 0.5% of W, not more than 0.5% of V, not more than 0.5% of Ti, not more than 0.5% of Nb, not more than 0.5% of Ta, not more than 0.5% of Zr, not more than 0.5% of Hf, not more than 0.1% of Al and not more than 0.1% of N with the remainder being iron and impurities. In particular, in the case of the detection of the torque applied on a rotating shaft used as a heavy loaded rotative shaft such as power transmission shaft or a measuring shaft, it is remarkable that the output sensitivity of the torque detecting device can be increased and the hysteresis can be decreased at the same time, and detection of torque can be performed with accuracy while maintaining the strength of rotative shaft such as power transmission shaft.

EXAMPLE 2

FIG. 4 is a cross-sectional view illustrating a structure of the torque detecting device according to another example of this invention. The torque detecting device 11 shown in FIG. 4 has a measuring shaft 12. The alloy is composed of the disordered phase only or mixed phases comprising at least two phases of the Fe₃Al type ordered phase which is not more than 0.9 of ordered parameter, FeAl type ordered phase and FeAl type disordered phase. On the surface of said measured shaft 12, a member having concave parts 13a, 13b and convex parts 14a, 14b making a certain angle with the shaft direction of said measuring shaft 12 is formed to be integral with said measuring shaft 12 while leaving a suitable space between the yoke and the member. A shaped-magnetic anisotropy is given by these concave parts 13, 13b and convex parts 14a, 14b.

In this case, said concave part 13a, convex part 14a on the one side and concave part 13b, convex part 14b on the other side are provided as a pair with an inclination of 45° relative to the direction of the shaft in opposite directions relative to each other.

The torque detecting device 11 has a pair of coils 15a, 15b disposed in facing relation to the concave part 13a, convex part 14a on the one side and concave part 13b, convex part 14b on the other side which are formed on the said measuring shaft 12 as an addition to said measuring shaft 12, and the structure providing a cylindrical yoke 17 is made from a material with high permeability at the outside of coils 15a, 15b while leaving a gap 16 between the yoke and the measuring shaft 12.

Figure 5:
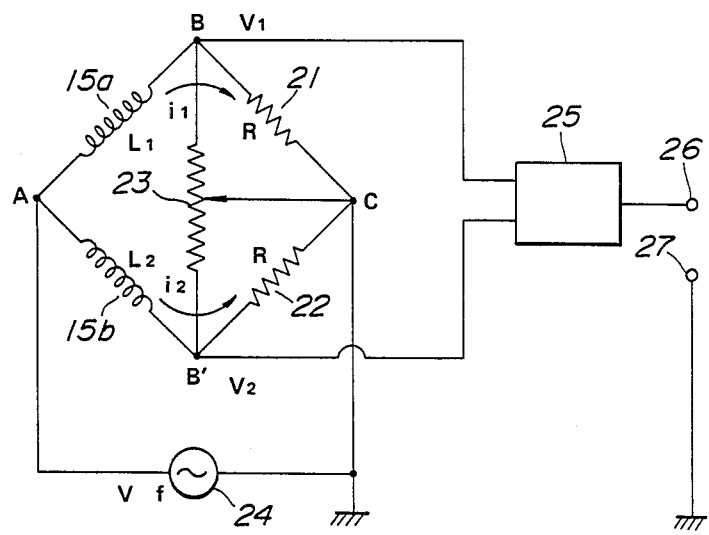
FIG. 5 is a diagram exemplifying the construction of an electric circuit for connecting to the torque detecting device of FIG. 4.

In the torque detecting device having such a structure, coils 15a, 15b compose the bridge circuit in combination with resistors 21, 22 as shown in FIG. 5. The bridge circuit is provided with a variable resistance 23 for balancing and the excitative direction is adjusted to the same direction. An excitative oscillator 24 is connected to points A, C in the bridge circuit and a detection output can be picked up from output terminals 26, 27 connected to a differential amplifier 25 which is connected to connecting points B, B'.

The operation of the torque detecting device 11 shown in FIG. 4 and the electric circuit shown in FIG. 5 will be described as follows.

First of all, during operation AC with constant amplitude (V) and frequency (f) is applied to the coils 15a, 15b from the oscillator for excitation 24. In consequence of this electric charging, lines of magnetic force forming the magnetic path comprised of measuring shaft 12→gap 16→yoke 17→gap 16→ measuring shaft 12 are generated by the coils 15a, 15b.

If the frequency (f) of applied AC is increased, the eddy current increases in the measuring shaft 12. The eddy current is distributed in the state such that the closer the position from the center of measuring shaft 12, the more powerful the eddy current is and becomes zero at the surface. Therefore, though the magnetization at the surface can follow the variation of the external magnetic field, the variation of magnetization at the inside is prevented.

Accordingly, said lines of magnetic force flow in a part of surface of measuring shaft 12, in particular in the convex parts 14a, 14b mainly, since the concave parts 13a, 13b are formed on the measuring shaft 12 at a certain angle with the shaft direction of the said measuring shaft 12, they become magnetic reluctance. Hence the effect of shaped-magnetic anisotropy owing to said concave parts 13a, 13b and convex parts 14a, 14b is produced.

Concerning the angle of said concave parts 13a, 13b and convex parts 14a, 14b to the shaft direction, the angle made with concave part 13a, convex part 14a on the one side and the angle with concave part 13b, convex part 14b on the other side should be the same but in opposite directions with each other, but it is the most desirable that the directions are in agreement with the direction of principal stress when the torque is applied on the measuring shaft 12, i.e., the direction of 45° to the right side and direction of 45° to the left side. The reason is that said lines of magnetic force flow in the direction of principal stress mainly, and since the surface part of the measured shaft 12 and the convex parts 14a, 14b have the largest strains, the variation of permeability owing to the strain of the magnetic substance can be picked up most effectively.

If the torque applied on the measuring shaft 12 in the direction T shown in FIG. 4, because the convex part 14a on the one side is formed in the direction of 45° to the right side, the maximum tensile stress $+\delta$ acts on it. On the contrary, because the convex part 14b on the other side is formed in the direction of 45Q to the left side, the maximum compressive stress $-\delta$ acts on it.

Therefore, it the measuring shaft 12 has a positive magnetostriction effect, the permeability of the convex part 14a on the one side increases in comparison with it when the torque is zero. On the contrary the permeability of convex part 14b on the other side decreases in comparison with it when the torque is zero.

Therefore, increasing the inductance of the coil 15a on the one side, and decreasing the inductance of the coil 15b on the other side, the balance of the bridge circuit shown in FIG. 5 breaks and an output corresponding to the torque T is generated between the output terminal 26 and 27.

When the torque is applied in the opposite direction, according to the action described above, decreasing the inductance of the coil 15a on the one side and increasing the inductance of the coil 15b on the other side, the balance of the bridge circuit shown in FIG. 5 breaks and an output corresponding to the torque T is generated between the output terminal 26 and 27.

In this example as described above, if the permeability of measuring shaft 12 is varied according to the temperature the zero point of output can cease to shift and it is possible to heighten the detecting accuracy of the torque because the forming of the concave parts 13a, 13b and convex parts 14a, 14b in a pair with reverse inclination facing the coils 15a, 15b respectively, and the difference of magnetism variation at said concave parts 13a 13b and convex parts 15a, 14b is detected by means of a bridge circuit.

Describing more concisely in regard to the above, when the inductance of coils 15a, 15b are described as $L_1$, $L_2$ respectively, resistance values of resistors 21, 22 are described as R, voltage and frequency of excitative oscillator 24 are described as V and f respectively, electric current $i_1$ flowing in the bridge circuit A-B-C and electric current $i_2$ flowing in the circuit A-B'-C are given by:

$$i_1 = \frac{V}{\sqrt{R^2 + (2\pi f L_1)2}}$$

$$i_2 = \frac{V}{\sqrt{R^2 + (2\pi f L_2)^2}}$$

and electric potential $V_1$ at point B is given by: $V_1 = i_1 \cdot R$ electric potential $V_2$ at point B' is given by $V_1 = i2 \cdot R$ therefore the potential difference between B-B' is given by:

$$\left| V_1 - V_2 \right| \text{ i.e.}$$

$$\left| \frac{1}{\sqrt{R^2 + (2\pi f L_1)^2}} - \frac{1}{\sqrt{R^2 + (2\pi f L_2)^2}} \right| \cdot R \cdot V$$

and this is increased by means of differential amplifier 25.

In the electric circuit shown in FIG. 5, it is more desirable that the frequency (f) of AC applied on coils 15a, 15b from the excitative oscillator 24 is in a range of as much as 1 KHz–100 KHz, so that it is possible to obtain high sensitivity and low hysteresis output characteristics.

In the torque detecting device according to an example of this invention, using a shaft made from iron-aluminum alloy, and using especially said alloy composed of disordered phase or composed of mixed phase comprising at least two phases of the Fe$_3$Al type ordered phase of which the order parameter is not more than 0.9, FeAl type ordered phase and disordered phase for the measuring shaft 12, are the same as described above. In this example the concave parts 13a, 13b and convex parts 14a, 14b are formed in the surface of measuring shaft 12 of 20 mm in diameter. In this case, a level-difference of concave parts 14a, 13b and convex parts 14a, 14b on the measuring shaft 12 are formed into 1 mm. The level-difference should be formed according to the degree of influence of said eddy current and may be sufficient in a range as much as 0.5 mm–1.5 mm if the frequency of AC applied from the excitative oscillator 24 is in a range as much as 1 KHz–100 KHz as aforesaid.

On the one hand, the space of said concave parts 13a, 13b and convex parts 14a, 14b may be set up so that shaped-magnetic anisotropy may be exhibited sufficiently, both concave parts 13a, 13b and convex parts 14a, 14b are formed with a space of 2 mm in this embodiment.

Figure 6:
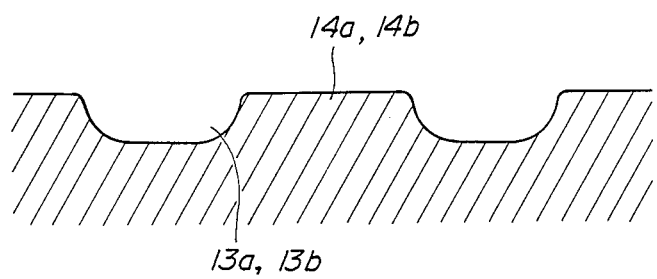
FIG. 6 is a model diagram exemplifying the cross-sectional form of a concave part of a convex part formed on the measuring shaft.

On the other hand, concerning the cross-sectional shape of the concave parts 13a, 13b and convex parts 14a, 14b, by forming them into a rounded shape as shown in a model diagram in FIG. 6, the influence of the notch can be decreased and machinability can be improved.

In FIG. 6, it is shown that the concave parts 13a, 13b are formed into rounded shape and convex parts 14a, 14b are flat shape, but if necessary it is desirable to form the convex parts 14a, 14b into rounded shape. It may be suitable that a fracture due to the notch effect in the case of applying the torque can be prevented by forming both into rounded shapes like this.

In the torque detecting device shown in this example the number of turns of said coils 15a, 15b should be set properly. In this case both coils 15a, 15b are made by winding 44 turns with copper wire of 0.6 mm in diameter. Further concerning the manner of connecting the copper wire in the coils 15a, 15b, by connecting the wire so that the direction of magnetic field by the coil 15a in one side and by coil 15b in the other side may conform to the same direction, the excited magnetic field is held in common and the output sensitivity can be heightened. In this example, measurement of the torque is performed under the condition that AC applied from the excitative oscillator 24 in the electric circuit shown in FIG. 5 is 10 KHz in excitative frequency and 100 mA in electric current.

Figure 7:
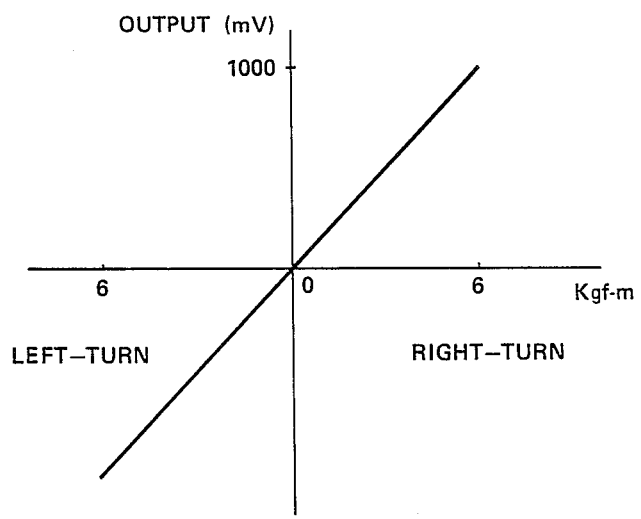
FIG. 7 and FIG. 8 are characteristic diagrams illustrating the relationship of torque and output when the measuring shaft is fixed at a certain position and stability of detecting output when the measuring shaft is rotated in one turn on the torque detecting device of the Example 2 of this invention, respectively.

Consequently, the torque-output characteristics is shown in FIG. 7 when the measuring shaft 12 is fixed at a certain position using the torque detecting device according to this example. Hereupon, balancing and adjusting the output are zero torque into the zero with the variable resistance 23 in the electric circuit shown in FIG. 5, the zero point is never shifted hereafter. And in this case, an excellent characteristic that the hysteresis is zero was shown.

Figure 8:
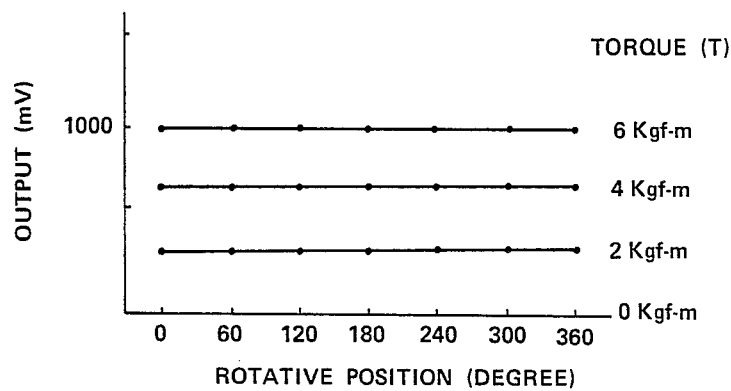

The output was as shown in FIG. 8, when the measuring shaft 12 is rotated. As shown in FIG. 8 there is no rotative fluctuation of zero point entirely on the torque detecting device 11 since the averaged variation of permeability over the whole circumference of the measuring shaft 12 is grasped, therefore the rate of fluctuation of output corresponding to applied torque was not produced entirely even if the torque is applied. Moreover, FIG. 8 and FIG. 10 are diagrams showing the experimental results when the measuring shaft is made from the iron-aluminum alloy comprising by weight 15% of Al, which contains Fe$_3$Al type ordered phase and disordered phase and order parameter of Fe$_3$Al type ordered phase if 0.3.

TABLE 2

| No. | Chemical composition (weight %) Al | others | | | Heat treatment | Sensitivity (V/Kgf · m) | Hysteresis (%) |
|---|---|---|---|---|---|---|---|
| Example | | | | | | | |
| 1 | 12.0 | — | — | — | — | 1100° C. × 3 hours → oil cooling (in vacuum) | 2.3 | 7 |
| 2 | 12.7 | — | — | — | — | 1100° C. × 3 hours → 700° C. slow cooling → oil cooling (in vacuum) | 3.2 | 0 |
| 3 | 13.5 | — | — | — | — | 1100° C. × 3 hours → 800° C. slow cooling → N$_2$ cooling (in vacuum) | 1.9 | 2 |
| 4 | 14.2 | — | — | — | — | 1100° C. × 3 hours → 580° C. slow cooling → oil cooling (in vacuum) | 1.5 | 4 |
| 5 | 12.7 | — | — | — | — | 1000° C. × 3 hours → 100° C./hr cooling (in H$_2$ gas) | 2.9 | 10 |
| 6 | 12.4 | Cr: 1.1 | — | — | — | 1100° C. × 3 hours → oil cooling (in vacuum) | 2.5 | 3 |
| 7 | 12.8 | Mo: 0.8 | — | — | — | 1100° C. × 3 hours → 700° C. slow cooling → oil cooling (in vacuum) | 2.7 | 2 |
| 8 | 13.1 | Mn: 1.5 | — | — | — | 1100° C. × 3 hours → 800° C. slow cooling → N$_2$ cooling (in vacuum) | 2.2 | 5 |
| 9 | 13.3 | V: 0.5 | C: 0.05 | — | — | 1000° C. × 3 hours → 700° C. slow cooling → oil cooling (in vacuum) | 2.1 | 3 |
| 10 | 12.9 | Nb: | Zr: | C: | — | 1100° C. × 3 hours → 800° C. slow cooling → | 1.8 | 4 |

TABLE 2-continued

| No. | Chemical composition (weight %) | | | | | Heat treatment | Sensitivity (V/Kgf · m) | Hysteresis (%) |
| --- | --- | --- | --- | --- | --- | --- | --- | --- |
| | Al | others | | | | | | |
| | | 0.3 | 0.2 | 0.1 | | 1000° C./hours cooling (in H₂ gas) | | |
| 11 | 12.0 | Co: 1.3 | Nb: 0.5 | C: 0.1 | — | 1100° C. × 3 hours → 1000° C./hours cooling (in H₂ gas) | 1.8 | 4 |
| 12 | 12.9 | Cr: 0.5 | Ni: 0.3 | Ti: 0.2 | C: 0.05 | 1100° C. × 3 hours → 580° C. slow cooling → oil cooling (in vacuum) | 1.8 | 6 |
| Comparative Example | | | | | | | | |
| 13 | 9.5 | — | — | — | — | 1100° C. × 3 hours → 700° C. slow cooling → oil cooling (in vacuum) | 1.0 | 14 |
| 14 | 18.5 | — | — | — | — | 1000° C. × 2 hours → 1000° C./hr cooling (in H₂ gas) | 0.9 | 7 |
| 15 | 13.1 | Co: 3.0 | Ni: 2.5 | V: 1.3 | — | 1000° C. × 3 hours → 100° C./hr cooling (in H₂ gas) | 0.7 | 18 |

Table 2 shows examples of the chemical compositions of the measuring shaft. Torque measuring test was performed by the use of the measuring shaft shown in Table 2 by the conditions of the above-mentioned, that is, the diameter of the shaft is 20 mm and driving torque is ±1 kgf · m.

The torque detecting device 11 according to the example of this invention is designed to improve the output sensitivity by using the yoke 17 made from a material with high permeability such as iron-nickel alloy, and so decreasing the leak of the lines of magnetic force, by yoke 17 need not be used always in consideration of balance with exciting current.

Furthermore, the variation of permeability of a pair of concave parts 13a, 13b and convex parts 14a, 14b due to the applied torque on said measuring shaft 12 is grasped as the variation of inductance of a pair of coils 15a, 15b, and detected by AC bridge through the differential amplifier 25, but measuring shaft 12 having said structure is applicable to the torque detecting device provided with an excitation coil and a detection coil.

As mentioned above, concerning Example 2 according to this invention, the torque detecting device having the measuring shaft and the coil for forming the magnetic circuit incorporating the said measuring shaft into a part of magnetic path, by detecting a magnetostrictive force passing through said measuring shaft, the hysteresis is very small and the accuracy of torque detection because said measuring shaft is made from the iron-aluminum alloy which is composed of the disordered phase or mixed phase comprising at least two phases of Fe₃Al type ordered phase, FeAl type ordered phase and disordered phase, and order parameter of Fe₃Al type ordered phase is not more than 09. Moreover, the fluctuation of output due to rotation of the measuring shaft does not exist entirely because the variation of magnetism due to applied torque on said measuring shaft is grasped over the whole circumference of the said measuring shaft, so that the torque of a rotating shaft at high speed can be measured with accuracy. When the shaped-magnetic anisotropy is given by forming the concave part and/or convex part on the measuring shaft, the zero point of output can be made to be fixed even if the permeability of the measuring shaft varies due to temperature change by means of detecting the difference between both said concave part and convex part formed in a pair with opposite inclination. Furthermore, the torque detecting device has an excellent effect since the means of torque detection can be composed in a very compact manner without using a coupling because the power transmission shaft can be used directly as the measuring shaft for the torque detecting device.

What is claimed is:

1. A torque detecting device having a measuring shaft, means for forming a magnetic circuit wherein said measuring shaft is a part of said magnetic circuit, and means for detecting a magnetostrictive force passing through said measuring shaft, wherein said measuring shaft is made from a steel comprised by weight percentage of 0.1-0.5% of C, not more than 1.0% of Si, not more than 2.0% of Mn, and one or both of not more than 5.0% of Ni and not more than 5.0% of Cr, with the remainder being iron and impurities.

2. A torque detecting device according to claim 1, wherein the total amount of Ni and Cr in said measuring shaft is in a range of 1.5-4.0%.

3. A torque detecting device according to claim 1, wherein said measuring shaft is carburized and the amount of C in the carburized layer is more than 0.1% but not more than 1.5%.

4. A torque detecting device according to claim 1, wherein said measuring shaft includes at least one of not more than 1.0% of Pb, not more than 0.5% of Ca, not more than 0.5% of Se, not more than 0.5% of Te, not more than 0.5% of Bi and not more than 0.5% of S.

5. A torque detecting device according to claim 1 wherein a concave part and convex part making a predetermined angle with the axial direction of said measuring shaft are formed with predetermined spacing on said measuring shaft.

6. A torque detecting device according to claim 1 wherein said means for forming the magnetic circuit incorporating said measuring shaft as a part of said magnetic circuit includes an excitation coil and said means for detecting a magnetostrictive force passing through said measuring shaft is comprised of a detection coil.

7. A torque detecting device according to claim 6 wherein said excitation coil and said detection coil are formed from a common coil with a common yoke.

8. A torque detecting device having a measuring shaft, means for forming a magnetic circuit wherein said measuring shaft is a part of said magnetic circuit, and means for detecting a magnetostrictive force passing through said measuring shaft, wherein said measuring shaft is made from a steel comprised by weight percentage of 0.1-1.5% of C, not more than 2.0% of Si, not more than 2.0% of Mn, and one or both of not more than 5.0% of Ni and not more than 5.0% of Cr, and at least one of not more than 1.0% of Cu, not more than 1.0% of Mo, not more than 0.5% of B, not more than 0.5% of W, not more than 0.5% of V, not more than 0.5% of Ti, not more than 0.5% Nb, not more than 0.5% of Ta, not more than 0.5% of Zr, not more than 0.5% of Hf, not more than 0.1% of Al and not more than 0.1% of N, with the remainder being iron and impurities.

9. A torque detecting device according to claim 8 wherein the total amount of Ni and Cr in said measuring shaft is in a range of 1.5-4.0%.

10. A torque detecting device according to claim 8, wherein said measuring shaft is carburized and the amount of C in the carburized layer is more than 0.1% to not more than 1.5%.

11. A torque detecting device having a measuring shaft, means for forming a magnetic circuit wherein said measuring shaft is a part of said magnetic circuit, and means for detecting a magnetostrictive force passing through said measuring shaft, wherein said measuring shaft is made from an iron-aluminum alloy composed of the disordered phase or composed of the mixed phase comprising at least two phases of $Fe_3Al$ type ordered phase, FeAl type ordered phase and disordered phase, and order parameter of $Fe_3Al$ type order phase being not more than 0.9.

12. A torque detecting device having a measuring shaft, means for forming a magnetic circuit wherein said measuring shaft is a part of said magnetic circuit, and means for detecting a magnetostrictive force passing through said measuring shaft, wherein said measuring shaft is made from an iron-aluminum alloy comprising, by weight percentage of, 11.0-15.0% of Al with the remainder being iron and impurities.

13. A torque detecting device according to claim 12, wherein said measuring shaft has been subjected to a heat-treatment which is cooled at a cooling rate of more than 500° C./hr from a temperature greater than 500° C.

14. A torque detecting device having a measuring shaft, means for forming a magnetic circuit incorporating said measuring shaft as a part of said magnetic circuit, and means for detecting a magnetostrictive force passing through said measuring shaft, wherein said measuring shaft is made from an iron-aluminum alloy comprised by weight percentage of 11.0-15.0% of Al, 0.01-5.0% in total of at least one of B, Si, Ge, Sn, Pb, P, Sb, Cu, Ni, Co, Mn, Cr, Mo, W, V, Nb, Ta, Ti, Zr, Hf, Be, Sc, Y and REM, with the remainder being iron and impurities.

15. A torque detecting device having a measuring shaft, means for forming a magnetic circuit incorporating said measuring shaft as a part of said magnetic circuit, and means for detecting a magnetostrictive force passing through said measuring shaft, wherein said measuring shaft is made from an iron-aluminum alloy comprised by weight percentage of 11.0-15.0% of AL, 0.01-0.50% of C, 0.01-5.0% in total of at least one of Cr, Mo, W, V, Nb, Ta, Ti, Zr and Hf, with the remainder being iron and impurities.

16. A torque detecting device having a measuring shaft, means for forming a magnetic circuit incorporating said measuring shaft as a part of said magnetic circuit, and means for detecting a magnetostrictive force passing through said measuring shaft, wherein said measuring shaft is made from an iron-aluminum alloy comprised by weight percentage of 11.0-15.0% of Al, 0.01-5.0% in total of at least one of B, Si, Ge, Sn, Pb, P, Sb, Cu, Ni, Co, Mn, Cr, Mo, W, V, Nb, Ta, Ti, Zr, Hf, Be, Sc, Y and REM, 0.01-0.5% of C, 0.01-5.0% in total of at least one of Cr, Mo, W, V, Nb, Ta, Ti, Zr and Hf (but not more than 5.0% in total of said B to REM and Cr to Hf) with the remainder being iron and impurities.

* * * * *